No. 883,108. PATENTED MAR. 24, 1908.
R. T. GILLESPIE.
ADJUSTABLE CLEANING BRUSH.
APPLICATION FILED APR. 5, 1906.
2 SHEETS—SHEET 1.
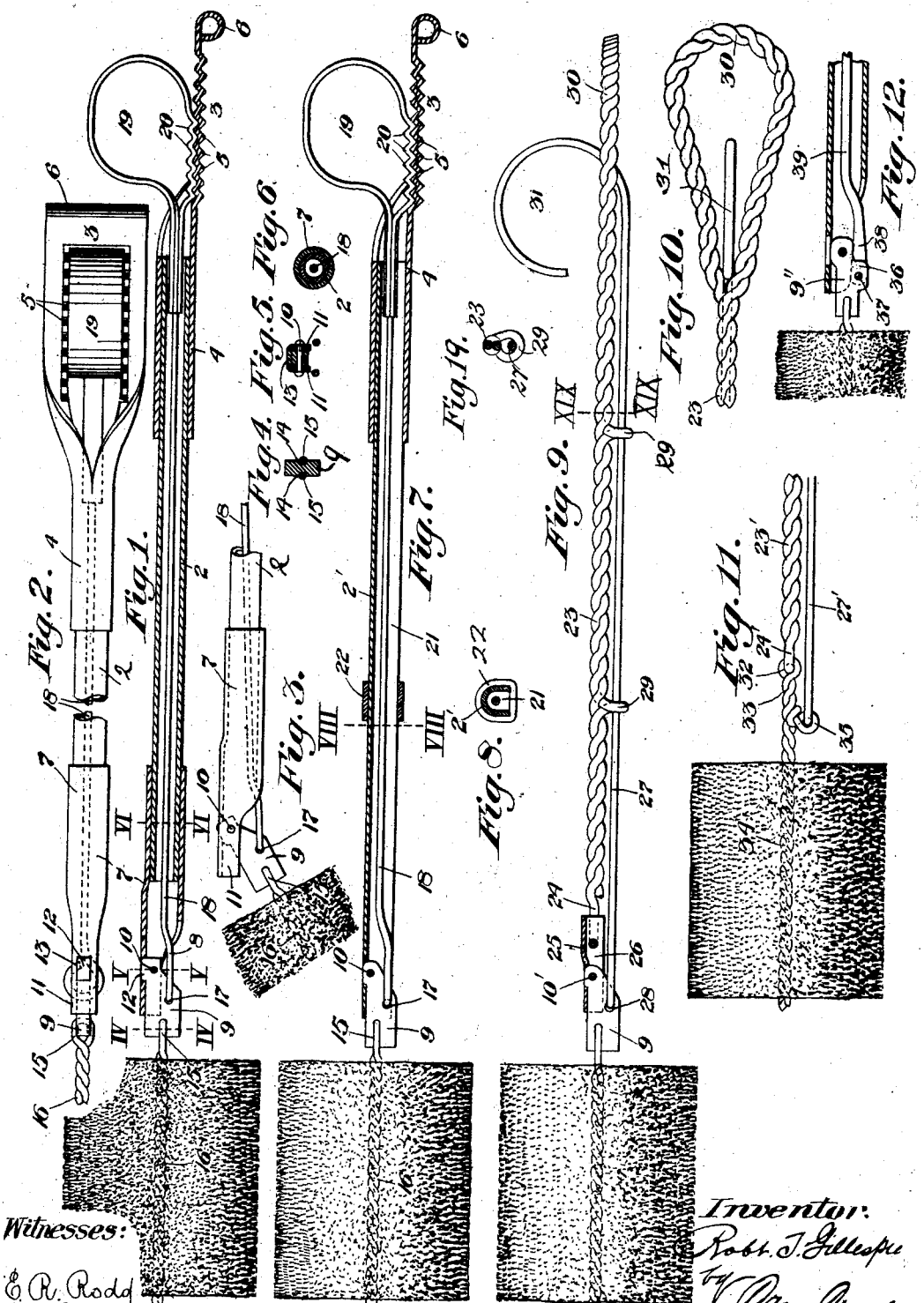
Witnesses:
E. R. Rodd
Chas. S. Lipley
Inventor:
Robt. T. Gillespie
by D. M. Clarke
his atty.

No. 883,108. PATENTED MAR. 24, 1908.
R. T. GILLESPIE.
ADJUSTABLE CLEANING BRUSH.
APPLICATION FILED APR. 5, 1906.
2 SHEETS—SHEET 2.
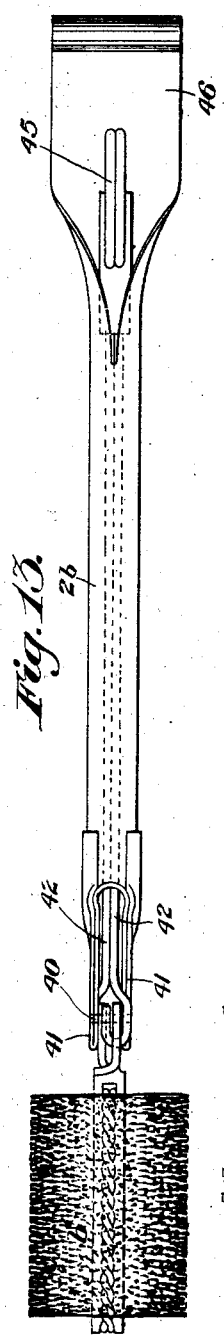
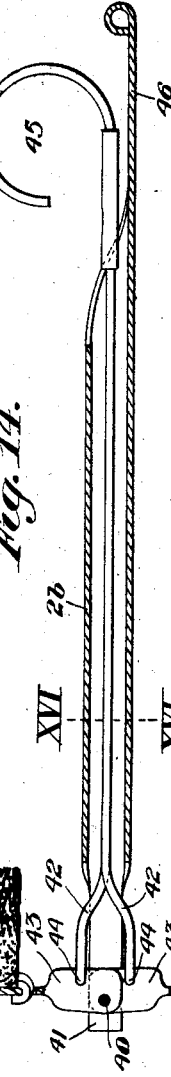
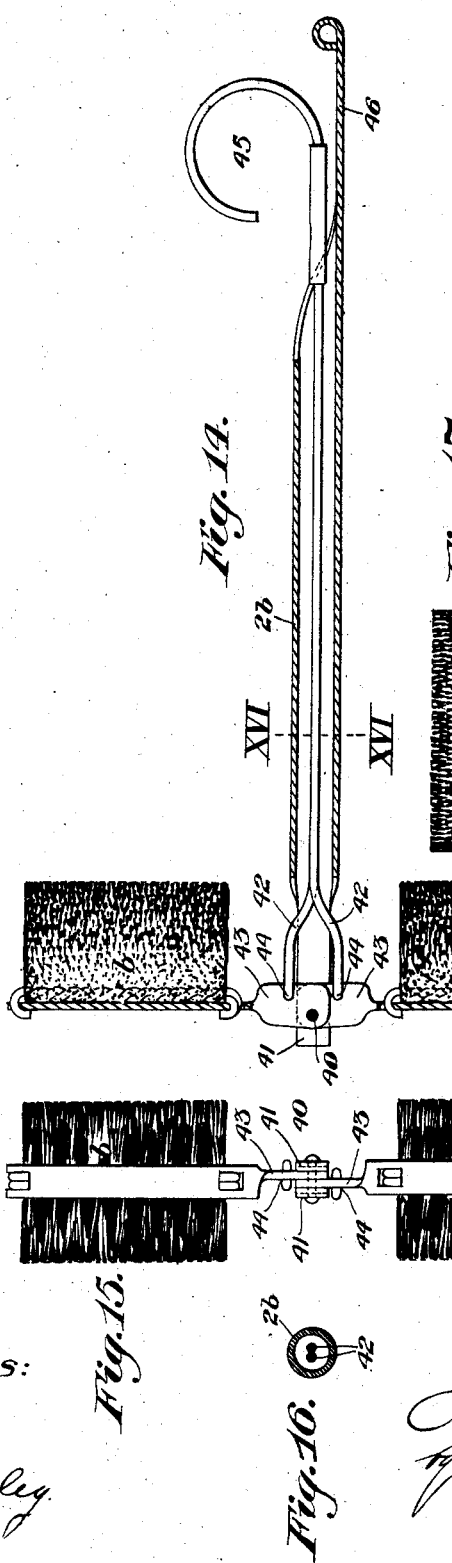
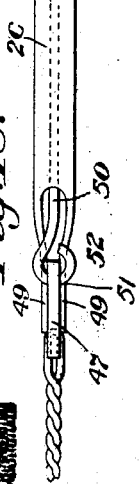
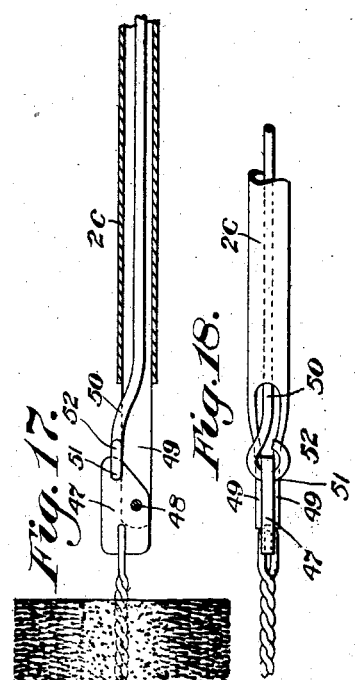
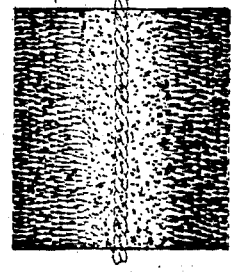
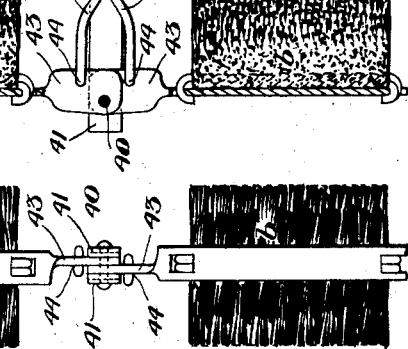
Witnesses:
E. R. Rodd
Chas. S. Ripley
Inventor:
Robt. T. Gillespie
by C. M. Clarke
his Attorney
THE NORRIS PETERS CO., WASHINGTON, D. C.

UNITED STATES PATENT OFFICE.

ROBERT T. GILLESPIE, OF BLOOMFIELD, NEW JERSEY.

ADJUSTABLE CLEANING-BRUSH.

No. 883,108.         Specification of Letters Patent.         Patented March 24, 1908.

Application filed April 5, 1906. Serial No. 310,064.

*To all whom it may concern:*

Be it known that I, ROBERT T. GILLESPIE, a citizen of the United States, residing at Bloomfield, in the county of Essex and State of New Jersey, have invented certain new and useful Improvements in Adjustable Cleaning-Brushes, of which the following is a specification, reference being had therein to the accompanying drawing.

My invention consists of a brush or cleaning implement adapted for use in the interior of hollow vessels or other articles such as jars, bottles, cruets, lamp chimneys, etc., and it has for its object to provide a brush which may be readily inserted within the reduced neck of such a vessel and then adjusted so as to present the brushes against the interior faces of the vessel at varying angles, or against the bottom portion.

My invention is designed to provide an article which may be readily and quickly adjusted by the hand while the brush is in the interior of the vessel being cleaned so as to reach all of its parts, and capable of being held in such adjusted position with facility and ease.

Generally stated, the device consists of a longitudinal shank portion, preferably tubular or of other suitable or convenient form, provided at the holding end with a thumb bearing extremity, an adjustable rod having a movable finger terminal in adjustable proximity to said thumb terminal and adapted for coöperation therewith, together with a hinged brush at the other end of the shank, so connected with said rod that it may be adjusted thereby and securely held in combination with the main shank or stem, as shall be more fully hereinafter described.

The invention comprises certain features of improvement, advantage and novelty in that class of similar devices shown and described in my prior application filed November 22nd, 1905 bearing the Ser. No. 288,572 and refers more particularly to the detailed construction.

Referring now to the drawings:—Figure 1. is a central longitudinal sectional view showing one form of the device, the brush being extended in alinement with the main shank or stem. Fig. 2. is a plan view of Fig. 1, partially broken away. Fig. 3. is a partial view of the brush end of the device, showing the brush adjusted at an angle to the shank or stem. Figs. 4, 5 and 6 are cross sectional detail views on the lines IV. IV., V. V. and VI. VI. of Fig. 1. Fig. 7. is a view similar to Fig. 1 but showing a modified construction of the main shank, open at one side. Fig. 8. is a cross sectional view on the line VIII. VIII. of Fig. 7. Fig. 9. is a view in side elevation, partly in section, showing a construction wherein the main shank or stem is formed of twisted wire. Fig. 10. is a plan view of the handle end of the construction shown in Fig. 9. Fig. 11. is a partial view of a similar construction at the brush end, showing the shank and brush holding portion composed entirely of twisted connected wire elements. Fig. 12. is a detail sectional view similar to Figs. 1 and 7 at the brush end, showing a further modified construction. Fig. 13. is a plan view of a construction providing for duplicate brushes. Fig. 14. is a central longitudinal sectional view of Fig. 13, showing the brushes extended at right angles to the shank. Fig. 15. is an end view of Fig. 14. Fig. 16. is a cross sectional detail view on the line XVI. XVI. of Fig. 14. Fig. 17. is a partial sectional detail view similar to Fig. 12, showing a still further modification. Fig. 18. is a plan view of Fig. 17. Fig. 19. is a cross section on the line XIX. XIX. of Fig. 9.

Referring to the drawings, 2 represents the main shank or stem of the device which as shown in Fig. 1 consists of a tube, provided at its holding extremity with a thumb extension 3 of flat or spoon form adapted to receive the ball of the thumb. The thumb extension 3 is formed as shown of a terminal tube 4 embracing the rear end of main tube 2, brazed to or otherwise connected therewith, being flattened out at its rear end to provide the thumb extremity. As shown, the thumb extremity is provided with a series of transverse teeth or corrugations 5 and is preferably rounded at the end in the form of a terminal bead 6. This latter feature gives a finishing edge to the rear portion of the device and at the same time provides a ledge or shoulder against which the ball of the thumb may bear.

At the other end the shank 2 is provided with an embracing ferrule 7 bent into rectangular form as shown and preferably open at one side as at 8, so as to provide a convenient hinge bearing for the pivoted brush bearing link 9. This link, in the principal figures of the drawings, consists of a flat metallic block, pivoted at 10 on a suitable pin hinge between flat cheeks 11, 11, of the ferrule terminal, the link being preferably provided with an upwardly extending shoulder 12 projecting through a corresponding opening 13 in the adjacent side of the ferrule bearing.

Beyond its pivotal portion the block 9 is widened as shown and provided with a transverse hole and longitudinally arranged recesses or grooves 14 adapted to receive the embracing wires 15. These wires are twisted together beyond such connection as at 16, engaging the assembled bristles of the brush, as will be readily understood.

An especial feature of advantage of this construction is that the tight twisting of the wires will hold them into engagement with the grooves 14 whereby the rigid mounting of the brush holding wires with the block 9 is insured, thus stiffly connecting these elements.

The block 9 is provided with a transverse opening 17 somewhat beyond the pivotal bearing 10, with which is connected the terminal of an operating rod 18 extending backwardly through the tubular shank 2 and provided with a finger holding loop 19 which may be conveniently made of sheet metal attached to the rod 18 in any suitable manner. The face of the finger loop 19 is corrugated as shown at 20 so as to interfit with the corrugations 5 of the thumb terminal 3, the corrugations being of any suitable form, either V shaped, rounded or otherwise. When these parts are pressed together, as can be readily done by the thumb and finger, or which may be normally effected by the inherent resiliency of the parts, the movable brush may be held immovably in fixed relation with the main stem at varying angles, so as to temporarily constitute a relatively fixed construction. This feature of the invention is of great advantage in relieving the fingers from the strain of holding the parts in adjusted position and will greatly facilitate the operation and handling of the device.

The construction shown in Fig. 7 is generally similar to that just described, except that the main shank 2' is in trough form whereby it is open along one side as indicated at 21, being formed of a bent strip of metal, braced at one or more points along its length by an encircling ferrule 22, or in any other suitable manner. Otherwise the construction and operation is substantially the same as just described.

In Fig. 9 I have shown a modified form of the device in which the shank 23 is formed of twisted wires, the end terminal of the shank comprising merely a loop 24 fixedly connected with a hinge terminal portion 25 formed of thin sheet metal bent generally in the same form as the front pivotal mounting portion of the construction shown in Fig. 1, providing embracing cheeks 26, between which the brush holding block 9' is embraced and to which it is pivoted as indicated at 10'. 27 represents the operating rod of the device, pivotally connected in the same general manner with the block 9' as at 28, extending backwardly along the shank 23 and passing through one or more loops 29 formed by strands of the wire which project out from the main body portion. At the rear or holding extremity of shank 23, it is designed in any suitable manner to provide a flat grasping terminal 30, indicated in Fig. 10, the wire strands being woven or plaited and incidentally providing a rough grasping surface. The rear terminal of rod 27 is bent around into loop form 31, extending upwardly through a suitable aperture in the thumb holding extremity, whereby the other extremity may be manipulated and held with relation to the shank extremity as will be readily apparent.

In Fig. 11 I have shown a main stem or shank 23' formed of twisted wire as just described, terminating in a loop extremity 24' upon which is pivotally mounted at 32 the rear twisted extremity 33 of the brush holding wire stem 34, adapted to be thus pivotally mounted at the outer end of the main shank in the same general manner as already set forth. The twisted wire brush holding extremity of this construction is also provided with a laterally projecting loop 35 extending beyond the central portion of the shank, with which is pivotally connected the terminal of the operating rod 27', whereby the brush may be manipulated in the same way.

In Fig. 12 the construction shown is generally similar to that already described as to Figs. 1 and 7, the block 9" having one or more laterally projecting cheeks 36, to which at 37 is pivotally connected the terminal 38 of the operating rod 39, the construction otherwise being the same as already described.

Figs. 13, 14 and 15 illustrate a construction wherein I employ a simultaneously operative pair of brushes b, b, the main stem or shank portion of which may be of any suitable form or construction, overlapping each other side by side and pivoted at 40 between the cheeks 41 forming the end terminals of the main tubular shank 2ᵇ. Said shank is formed in substantially the same way as the tubular stem of Fig. 1, but for the purpose of reinforcing the extremities or cheeks 41, these parts are doubled upon themselves, the outer layers being extended backwardly and brazed or otherwise secured to the main stem, as clearly shown in Fig. 13.

The operation of the brushes is effected by duplicate rods 42, 42, pivotally connected to blocks 43, 43, at 44, passing backwardly through the hollow stem 2ᵇ and terminating in the looped extremity 45. The hollow stem 2ᵇ is provided at its back portion with a flat thumb holding portion 46 of the same general construction as already described, with which the looped extremity 45 may be held in varying positions. As thus constructed the device will operate in the same manner as will a single brush, the double brushes being capable of simultaneous adjustment to laterally extending positions as shown in Fig. 14, or to longitudinal alinement with the hollow stem, as in Fig. 13.

In Figs. 17 and 18 I have shown a still further modification in which the pivoted block 47 is pivotally connected at 48 between the terminal cheeks 49 of the main shank 2ᶜ and is actuated by a stem 50 pivotally connected at 51 to the rear terminal extremity of block 47 by means of an eye 52 of loop or circular form. Said eye, projecting outwardly and across the edges of cheeks 49, positively limits back travel of stem 50 and consequent movement of block 47 and the connected brush, whereby it may be held in longitudinal alinement as shown in Fig. 17 without further limiting abutments or stops. The adjustment and manipulation of the brush otherwise is the same as in the other forms.

By reason of the constructions shown, the brush may be made of few parts of simple and cheap construction; it is very strong and durable, not liable to get out of order, and the entire apparatus will be found to be generally well adapted and efficient for the objects in view.

What I claim is:—

1. In a brush, the combination of a main shank adapted to surround and guide the operating rod and having a holding terminal provided with corrugated locking faces, a longitudinally movable operating rod mounted within said main shank and having a rear loop, also provided with corrugated locking faces arranged for coöperation with said holding terminal, a brush block pivoted at the other end of said main shank and pivotally connected with the operating rod and provided with a doubled bristle-holding wire extending forwardly and spirally twisted together, and bristles mounted between and held by twisted portions of the said wire, substantially as set forth.

2. In a brush, the combination of a main shank adapted to surround and guide the operating rod and having a holding handle provided with an enlarged rounded terminal, a longitudinally movable operating rod mounted within said main shank and having a rear finger loop located adjacent to said rounded terminal and adapted to be pressed against the holding handle for fixedly holding the handle and operating rod together by the operator, a brush block pivoted at the other end of said main shank and pivotally connected with the operating rod at one side of said pivotal mounting, and so arranged whereby the pivotal connection between the operating rod and the block will limit the travel of the block to extreme positions substantially in longitudinal alinement with and substantially at right angles to the main shank respectively, a doubled spirally-twisted bristle-holding wire connected with and extending forwardly in alinement with the block, and brush bristles mounted between and held by said twisted wire, substantially as set forth.

3. In a cleaning implement of the class described, the combination with a holding shank provided with connected terminal cheeks, of a brush block pivotally mounted between said cheeks and having a shouldered bracing portion adapted to act against the connection between the cheeks, a brush structure consisting of a bristle-holding wire passed through the forward portion of said block and spirally twisted together securing the brush bristles between said twisted wire portions, and an operating rod connected to the brush block laterally of the pivoting hinge portion, extending backwardly along the main shank, and provided with a finger terminal, substantially as set forth.

In testimony whereof I affix my signature in presence of two witnesses.

ROBERT T. GILLESPIE.

Witnesses:
   GUY T. WHITNEY,
   ARTHUR LENTHAUSSER, Jr.